July 8, 1969　　　I. O. FIELDGATE ET AL　　　3,454,204
MAGNETIC TAPE TRANSPORT WITH IMPROVED MECHANICAL
TAPE MOTION SENSOR
Filed July 6, 1965　　　　　　　　　　　　Sheet 1 of 3

INVENTORS
*Ivan O. Fieldgate &
Nicholas A. Livote*
BY *Lane, Aitken, Dunner & Ziems*
ATTORNEYS July 8, 1969   I. O. FIELDGATE ET AL   3,454,204
MAGNETIC TAPE TRANSPORT WITH IMPROVED MECHANICAL
TAPE MOTION SENSOR
Filed July 6, 1965   Sheet 2 of 3
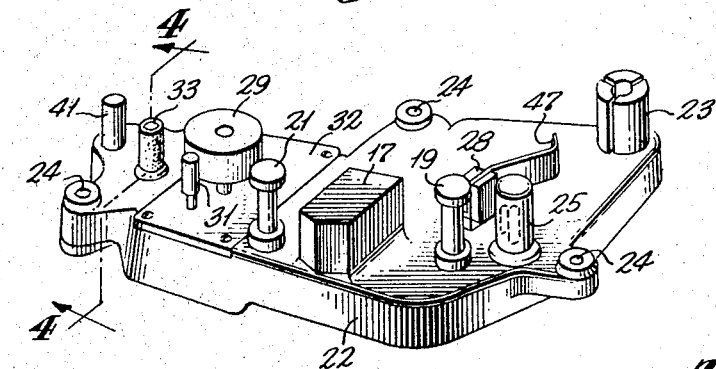
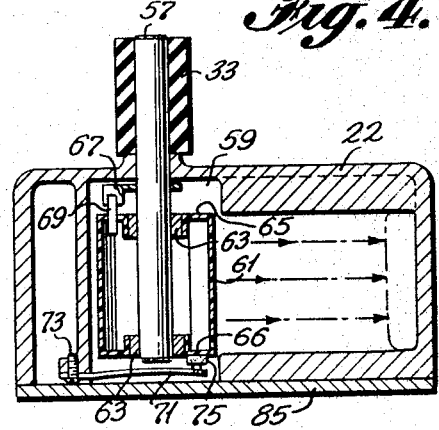
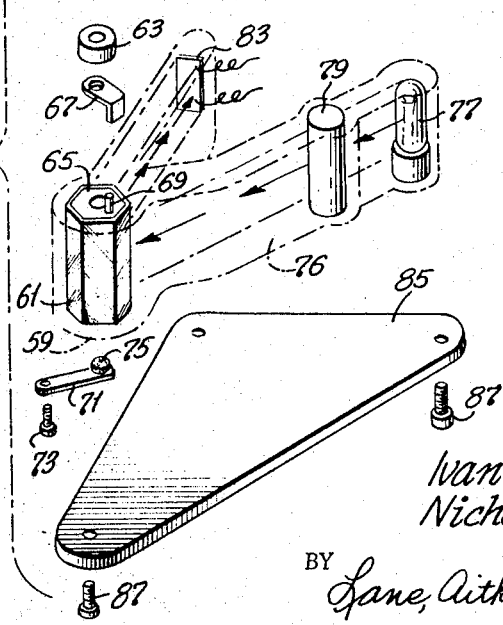
INVENTORS
*Ivan O. Fieldgate &*
*Nicholas A. Livote*
BY
*Lane, Aitken, Dunner & Ziems*
ATTORNEYS INVENTORS
Ivan O. Fieldgate &
Nicholas A. Livote
BY Lane, Aitken, Dunner & Ziems
ATTORNEYS 3,454,204
MAGNETIC TAPE TRANSPORT WITH IMPROVED MECHANICAL TAPE MOTION SENSOR
Ivan O. Fieldgate, Halesite, and Nicholas A. Livote, Kings Park, N.Y., assignors to Potter Instrument Company, Inc., Plainview, N.Y., a corporation of New York
Filed July 6, 1965, Ser. No. 469,789
Int. Cl. B65h 25/32, 17/22
U.S. Cl. 226—43                                    13 Claims

ABSTRACT OF THE DISCLOSURE

This specification discloses a tape transport employing a tape motion sensor having a hollow six-sided reflector which is driven directly by a roller engaged by the tape. A lens focuses a beam of light on the reflector, which reflects the beam of light to a photocell. As the tape is advanced in one direction, it rotates the reflector causing pulses to be produced by the photocell. The number of pulses produced by the photocell provides an indication of the amount of tape travel.

---

This invention, generally, relates to magnetic tape transports and, more particularly, to an incrmental tape transport with an improved mechanical tape motion sensor.

To simplify structure and improve reliability, magnetic tape transports frequently employ mechanical sensors to indicate the amount of tape travel, rather than sensing the motion of the tape electronically. Usually such a mechanical tape motion sensor is in the form of a tone wheel driven directly by the tape or by the tape drive capstan.

The mechanical tape motion sensor of the present invention provides an indication of the amount of tape travel without time lag and without wear of the sensor, which leads to inaccuracy. Also, the mechanical sensor of the invention has low inertia, thereby not increasing the inertia of the overall system.

The system of the present invention employs a tape motion sensor having a hollow six-sided reflector which is driven directly by a roller engaged by the tape. A lens focuses a beam of light on the reflector, which reflects the beam of light to a photocell. As the tape is advanced by the capstan, it rotates the six-sided reflector, and the six-sided reflector repeatedly irradiates the photocell with the beam of light that it reflects. The repeated irradiation of the photocell causes the photocell to produce output pulses, the number of which provides an indication of the amount of tape travel. The thin walled six-sided reflector has extremely low inertia and, thus, does not substantially increase the inertia of the system and does not place a substantial load on the magnetic tape.

A counter is provided to count pulses produced in response to the repeated irradiation of the photocell. Means are provided to produce a signal when a predetermined count is registered in the counter thus indicating that a predetermined length of tape has been advanced so that it can be determined when a block of information of approximate predetermined character length has been recorded. Additional means are provided which respond to the count registered in the counter to automatically advance the tape a predetermined amount to generate a gap on the tape between information blocks.

Accordingly an object of the present invention is to provide a magnetic tape transport system with an improved mechanical tape motion sensor.

Another object of the present invention is to provide a magnetic tape transport system with a mechanical tape motion sensor of reduced inertia.

A further object of the present invention is to provide an incremental magnetic tape transport with improved means for indicating when the tape has traveled an approximation of a predetermined number of incremental steps.

A still further object of the present invention is to provide an incremental tape transport with improved means for automatically producing on the tape gaps of a predetermined length between recorded blocks of information.

Further objects and advantages of the present invention will become readily apparent as the following detailed description of the invention unfolds and when taken in conjunction with the drawings, wherein;

FIG. 2 illustrates how various components of the incremental tape transport of the present invention are mounted on a common casting;

FIG. 3 is an exploded view of a portion of FIG. 2 illustrating the improved low inertia tape motion sensor of the present invention;

FIG. 4 is a sectional view taken along lines 4—4 of FIG. 2 illustrating the improved low inertia tape motion sensor of the present invention.

Figure 1:
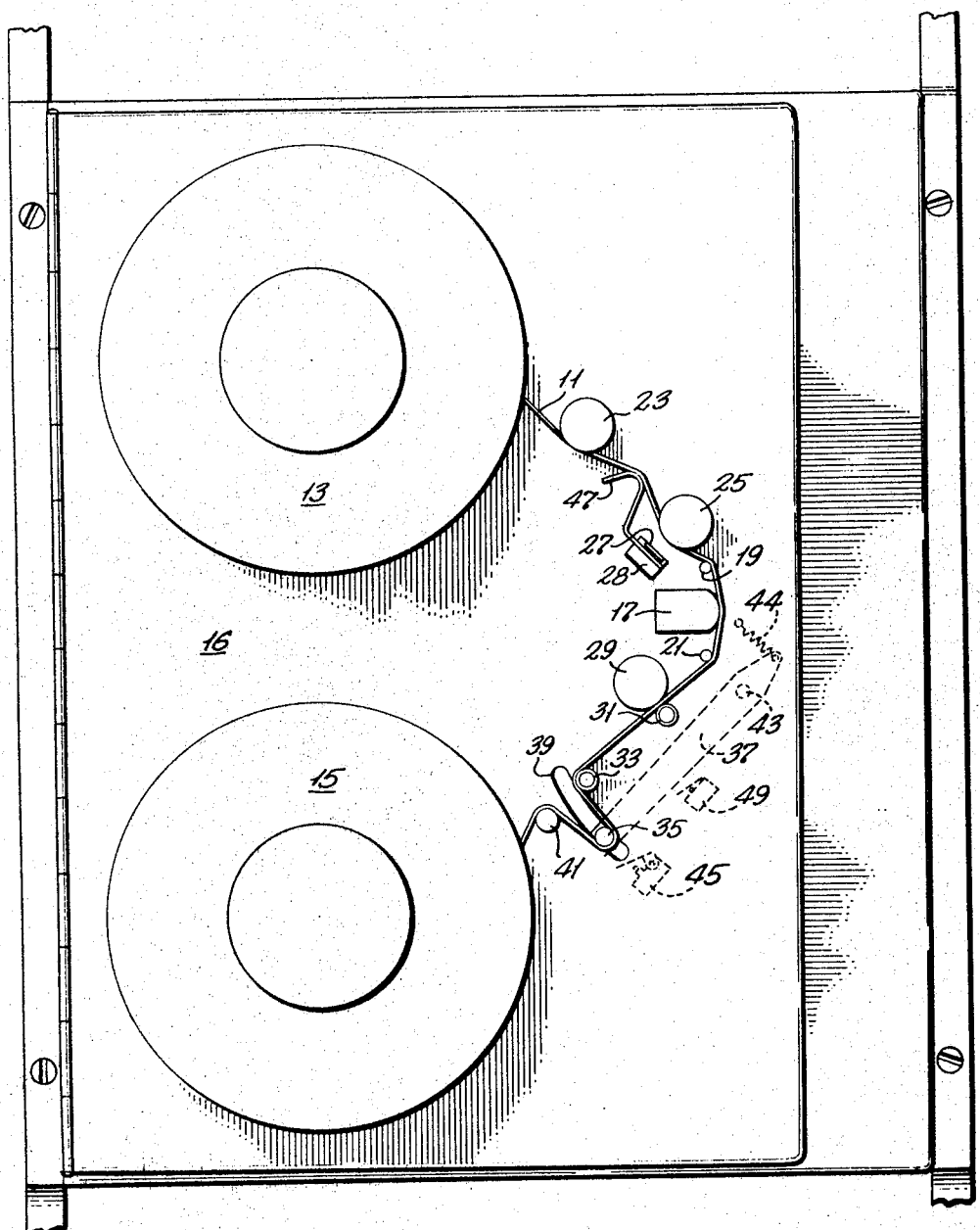
FIG. 1 is a view of an elevation of the incremental tape transport of the present invention.

In the incremental magnetic tape transport of the present invention, as shown in FIGURE 1, the magnetic tape, which is designated by the reference number 11, is unreeled from a supply tape reel 13 and wound up on a take-up tape reel 15 passing in front of a tape deck 16. The tape in passing from the supply reel 13 to the take-up reel 15 is guided over a recording head 17 by means of guides 19 and 21. As shown in FIGURE 2 the recording head 17 and the guides 19 and 21 are mounted on a casting 22 positioned behind the tape deck 16 and extend to the front of the tape deck through apertures provided in the tape deck. The casting 22 is mounted behind the deck 16 by means of mounting holes 24. The recording head 17 records binary data in a plurality of parallel tracks on the tape 11.

A permanent magnet erase head 23 is positioned so that the tape 11 passes in transducing relationship with the erase head 23 in traveling from the supply reel 13 to the guide 19. Accordingly, the erase head 23 clears the tape of any recordings prior to the tape reaching the recording head 17. The erase head 23 is also mounted on the casting 22 and extends to the front of the deck 16 through an aperture provided in the tape deck.

An end-of-tape sensor 25 is also positioned adjacent to the tape 11 between the guide 19 and the supply reel 13. The end-of-tape sensor 25 comprises a light source mounted within a cylindrical housing which is provided with an opening to direct light toward a photocell 27, which is mounted on a block 28. Normally the opaque magnetic tape 11 will cover the opening in the cylindrical housing and will prevent light from the source from irradiating the photocell 27. The end of the magnetic tape 11, which is the last portion of the tape 11 to be unreeled from the reel 13, is transparent, so that when this transparent portion of the tape reaches a position opposite the end-of-tape sensor 25, light from the light source of the sensor 25 will pass through the tape 11 and irradiate the photocell 27 which then produces a signal indicating that the end of the tape has been reached. The end-of-tape sensor 25 and the block 28 containing the photocell 27 are both mounted on the casting 22 and extend through apertures provided in the tape deck 16.

After passing over the transducing head 17 and the guide 21, the magnetic tape passes between a capstan 29 and a clamping roller 31, which holds the magnetic tape against the capstan 29. The capstan 29 is driven by a stepping motor and incrementally advances the tape in steps past the recording head 17. Each time the tape is advanced one step, the head 17 can record a binary bit of information on each track of the tape. The combination of binary bits recorded in all the tracks across the tape at one stepping position is referred to as a binary character. The stepping motor drives the capstan 29 to advance the tape 11 in increments of 0.005 inch so that 200 binary bits of information can be recorded in each track per inch of tape, and 200 binary characters can be recorded per inch of tape. The stepping motor is mounted in the casting 22 beneath a cover plate 32 mounted on the casting. The axle of the clamping roller 31 is rotatably mounted in the casting 22 beneath the cover plate 32. Apertures are provided in the tape deck 16 and in the cover plate 32 to accommodate the axles of the capstan 29 and the clamping roller 31.

After passing by the capstan 29, the tape 11 is wrapped partially around a roller 33 and then around a roller 35 mounted on a movable tension arm 37 pivotally mounted behind the deck 16. The roller 35 extends through the deck 16 in a slot 39. The tape 11, after passing around the roller 35, passes around a guide post 41 and then passes to the take-up reel 15. The axle of the roller 33 and the guide post 41 are mounted in the casting 22. Accordingly the axis of the roller 33 and the guide post 41 are fixed relative to the tape deck 16 whereas the roller 35 moves in the slot 39 as the arm 37 is pivoted about a pivot point 43. A spring 44 biases the tension arm 37 in a counter-clockwise direction so that the roller 35 holds a loop of tape between the roller 33 and the guide post 41 and maintains the tape in tension between the take-up reel 15 and the capstan 29. If the tape 11 should break, the spring 44 biasing the tension arm 37 would cause it to rotate counter-clockwise to engage a limit switch 45, which would close and provide an indication of the tape breakage.

A leaf spring 47 is mounted in the block 28 and engages the tape between the permanent magnet erase head 23 and the end-of-tape sensor 25. The purpose of the spring 47 is to take up slack in the tape 11 when the tape is caused to be stepped in a backward direction by the stepping motor and capstan 29. The spring 47 will maintain the tape in tension between the capstant 29 and the supply reel 13 when the tape is stepped backward one space. In effect, the spring 47 provides tape storage to accommodate backward stepping of the tape.

As the tape is advanced by the capstan 29, the supply reel 13 is caused to rotate by the force applied thereto by the tape, overcoming the force of a brake continuously applied to the supply reel. The brake on the supply reel serves to prevent the supply reel from coasting so that the tape is maintained in tension between the supply reel and the capstan 29.

As the capstan advances the tape, the tension arm 37 will pivot in a counter-clockwise direction under the force of the spring 44 increasing the length of the loop around the roller 35 and between the roller 33 and the guide post 41 so that the tape is maintained in tension between the capstan 29 and the take-up reel 15. The tension arm will continue to pivot in a counter-clockwise direction under the force of the spring 44 as the tape is advanced until it engages and closes a limit switch 49, which upon being closed will energize a motor driving the take-up reel 15 in a direction to wind up the tape. As the motor drives the take-up reel, it will shorten the length of the tape loop around the roller 35 and thus cause the tension arm 37 to pivot in a clockwise direction. The motor will continue to drive the take-up reel 15 until the tension arm 37 disengages the limit switch 49 and allows it to open thus deenergizing the motor, whereupon further advances of the tape by the capstan 29 will again cause the tension arm 37 to pivot in a counter-clockwise direction. In this manner the take-up reel 15 is rotated to wind up the tape at the same average rate that it is advanced by the capstan 29. The limit switch 49 is positioned so that it will be engaged and closed before the limit switch 45 is engaged and closed. Thus the limit switch 45 will not be closed under normal operations and will only close upon some malfunctioning, such as the tape breaking or the take-up reel 15 failing to wind up the tape in response to the closure of the limit switch 49.

As best illustrated in FIGS. 3 and 4, the roller 33 is covered with a high friction material, which in the preferred embodiment is rubber. The axle 57 of the roller 33 is journaled to be rotatably mounted in the casting 22.

The casting 22 has defined therein a V-shaped cavity 59 best illustrated in phantom in the exploded view of FIG. 3. Positioned within the corner of the V-shaped cavity 59 is a thin walled rotatable reflector 61, which is tubular in shape and has six reflecting sides distributed about its axis. More specifically the reflector 61 is in the form of a cylinder, which is hexagonal in cross-section. The thin walled structure of the reflector 61 is achieved by polishing the reflecting surfaces before the surfaces are formed into the hexagonal cylinder. The reflector 61 is rotatably mounted on the axle 57 by means of bearings 63, which are mounted in the end walls 65 and 66 of the tubular reflector 61. The end walls 65 and 66 also provide support for the six reflecting sides of the reflector 61.

A drive tab 67 is mounted with a tight fit on the axle 57 so as to rotate therewith. A pin 69 is mounted in the end wall 65 to be engaged by the drive tab 67 so that as the roller 33 rotates driven by the magnetic tape, the drive tab 67 will rotate therewith and engage the pin 69 causing the six-sided reflector 61 to rotate with the roller 33.

A spring strip 71 is fixed to the casting 22 by means of a screw 73. The spring strip 71 has a brake pad 75 mounted on the end thereof and is positioned so that the brake pad engages the end wall 66 of the six-sided reflector 61. The function of the spring strip 71 and the brake pad 75 is to act as a brake and prevent the six-sided reflector 61 from rotating when the tape is back-stepped. When the tape is back-stepped the six-sided reflector 61 will be held in place by the brake comprising the strip 71 and the brake pad 75 while the axle 57 rotates in the bearings 63 moving the tab 67 out of engagement with the pin 69. In this manner a driving connection is provided between the roller 33 and the six-sided reflector 61 which only rotates the six-sided reflector 61 when the tape is being advanced in a forward direction. Moreover when the tape has been back-spaced the reflector 61 will not again be rotated until the tape has been advanced again to the position from which it was back-spaced. Thus the amount of rotation of the six-sided reflector 61 will provide a true indication of the amount of forward advance of the magnetic tape.

At the end of one arm 76 of the V-shaped cavity 59 a lamp 77 is mounted. A lens 79 mounted in the arm 76 focuses the light produced by the lamp 77 on the six-sided reflector 61. At the end of the other arm 81 of the V-shaped cavity 59 a photocell 83 is positioned to receive light reflected from the six-sided reflector 61. As the six-sided reflector 61 rotates it will repeatedly direct the light beam focused thereon by the lens 79 to irradiate the photocel 83, which will therefore, produce six pulses for each revolution of the six-sided reflector 61. In this manner pulses are produced indicative of the forward travel of the magnetic tape. The six-sided reflector 61 will rotate one revolution for each advance of the tape of 0.72 inch so that each pulse produced by the photocell 83 will represent a tape advance of 0.12 inch or 24 binary characters.

The importance of the one-way driving connection between the roller 33 and the six-sided reflector 61 will now be apparent. If the six-sided reflector 61 were fixed to rotate with the roller 33 in either direction, then under some conditions the photocell 83 would produce an output pulse as a result of being irradiated on a back-step and then produce additional output pulses upon being driven forward again, thus providing a false indication of the total amount of tape travel in the forward direction.

The bottom cavity 59 formed in the casting 22 is covered by means of a plate 85 which is fastened to the casting 22 by means of screws 87. The plate 85 prevents external light from causing spurious pulses to be produced by the photocell 83.

Figure 5:
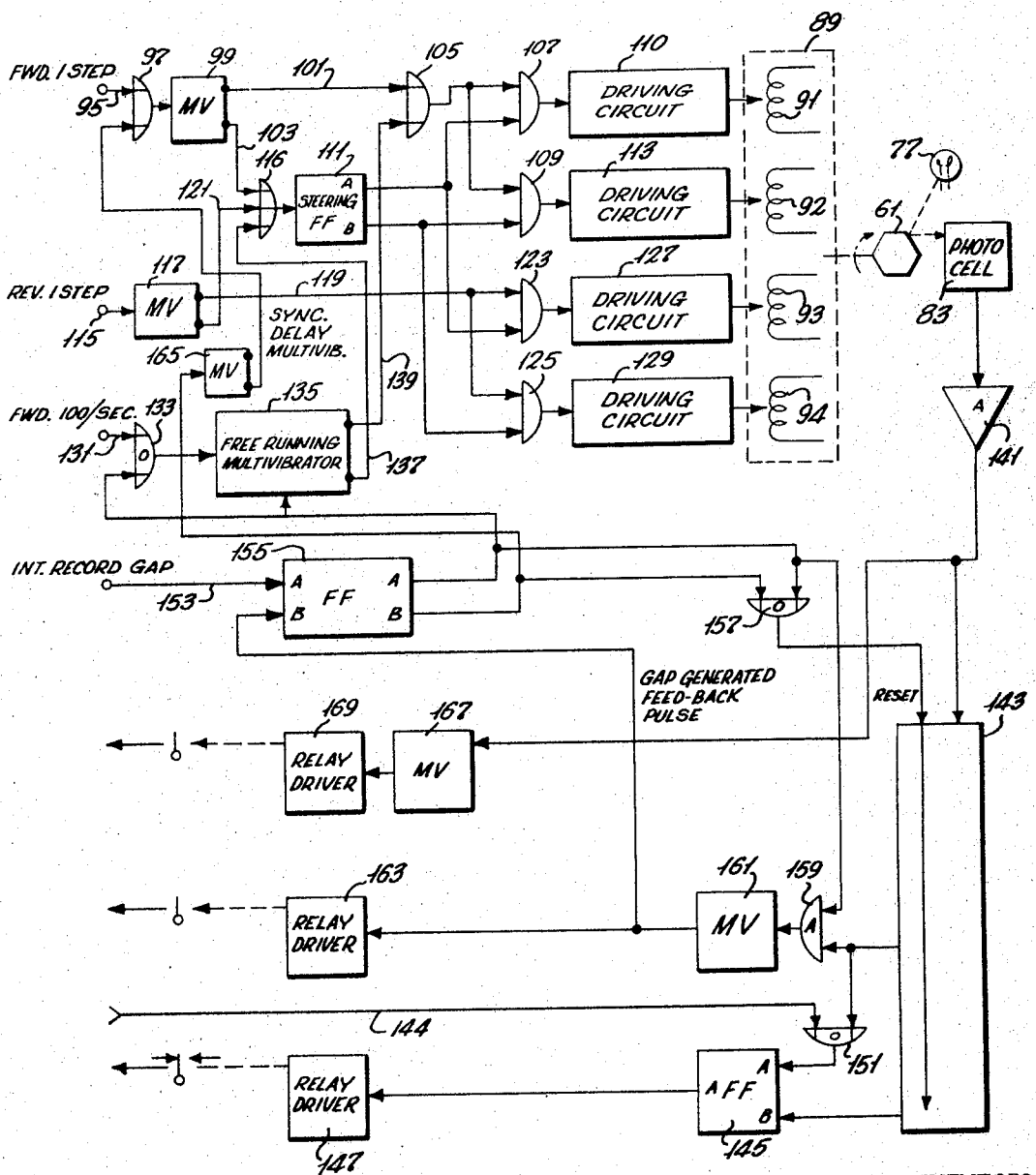
FIG. 5 is a block diagram of the circuit employed in the incremental tape transport of the present invention.

In FIG. 5 the stepping motor which drives the capstan 29 is represented by a block in dashed lines designated by the reference number 89. The stepping motor 89 is of the type manufactured by Sigma Instrument Co., Inc. and sold under the trademark Cyclonome. The stepping motor 89 has four input windings 91–94. The windings 91 and 92 are used to drive the stepping motor in a forward direction and the windings 93 and 94 are used to step the tape backwards. The motor is designed to advance the tape one step in response to each applied input pulse but the pulses must be applied alternately to the windings 91 and 92. Similarly, the motor will step the tape backwards one step in response to each applied pulse but the pulses must be applied alternately to the windings 93 and 94. Each time it is desired to have the motor 89 advance the tape one step, a pulse is applied to an input 95. Each pulse upon being applied to the input 95 passes through an OR gate 97 to a one-shot multivibrator 99. In response to each applied input pulse the multivibrator 99 first produces an output pulse on a channel 101 and then produces an output pulse on a channel 103. The pulse produced on channel 101 will pass through an OR gate 105 and be applied to AND gates 107 and 109. One of the AND gates 107 and 109 will be enabled by a signal from a steering flipflop 111. If the flipflop 111 is in its A state, it will enable the gate 107, and if the flipflop 111 is in its B state, it will enable the gate 109. If the AND gate 107 is enabled the pulse upon passing through the OR gate 105 will then pass through the AND gate 107 to a driver circuit 110 which applies a stepping pulse to the winding 91. The stepping motor 89 will then advance one step and move the tape forward 0.005 inch. If the AND gate 109 is enabled by the steering flipflop 111, the pulse upon passing through the OR gate 105 will then pass through the AND gate 109 to the driving circuit 113. In response to receiving the pulse through the AND gate 109, the driving circuit 113 will apply a stepping pulse to the winding 92 to cause the motor to advance one step. The pulse produced on the channel 103 by the one-shot multivibrator 99 passes through an OR gate 116 to the steering flipflop 111 and causes the flipflop 111 to change states. Thus if the flipflop 111 is in its A state when a pulse is applied to the input 95, the resulting pulse produced on channel 101 and passing through the OR gate 105 will pass through the AND gate 107 and result in a stepping pulse being applied to the winding 91. In response to the pulse produced on channel 103, the flipflop 111 will switch to its opposite state and enable the AND gate 109. As a result when the next pulse is applied to the input 95, the resulting pulse produced by the one-shot multivibrator on channel 101, upon passing through the OR gate 105, will pass through the AND gate 109 resulting in a stepping pulse being applied to the input winding 92. In this manner the windings 91 and 92 are alternately pulsed in response to successive pulses applied to the input 95.

When it is desired to step the tape backwards one step, a pulse is applied to an input 115, which is connected to the input of a one-shot multivibrator 117. In response to receiving a pulse from the input 115, the one-shot multivibrator 117 first produces a pulse on an output channel 119 and then on an output channel 121. The pulse produced on channel 119 is applied to the AND gates 123 and 125. If the flipflop 111 is in its A state, it will enable the AND gate 123, and if the flipflop 111 is in its B state, it will enable the AND gate 125. If the flipflop 111 is in its A state, the pulse produced on the channel 119 will pass through the AND gate 123 to a driving circuit 127, which in response to receiving the pulse will apply a stepping pulse to the winding 93. The stepping motor 89 will then step the tape backwards one step. If the flipflop 111 were in its B state, then the pulse produced on the channel 119 would pass through the gate 125 to a driving circuit 129, which in response to receiving the pulse would apply a stepping pulse to the winding 94. The motor 89 upon receiving the stepping pulse on the winding 94 would step the magnetic tape backwards one step. The pulse produced on the channel 121 by the one-shot multivibrator 117 will pass through the OR gate 116 to the flipflop 111 and cause the flipflop 111 to switch to the opposite state. Normally more than one backward step will not occur in succession but if two backward steps in succession are called for by successive pulses applied to the input 15, the stepping pulses will be alternately applied to the windings 93 and 94 controlled by the flipflop 111 in the same manner that the flipflop 111 causes the stepping pulses to be alternately applied to the windings 91 and 92. If the stepping motor steps backward an odd number of steps between successive forward steps, the stepping pulses effecting the successive forward steps must be applied to the same one of the windings 91 and 92, and if the stepping motor steps backward an even number of steps between successive forward steps, the stepping pulses effecting the successive forward steps must be applied to different ones of the windings 91 and 92. Similarly if successive backward steps are separated by an odd number of forward steps, the stepping pulses effecting the successive backward steps must be applied to the same one of the windings 93 and 94, and if successive backward steps are separated by an even number of forward steps, the stepping pulses effecting the successive backward steps must be applied to different ones of the windings 93 and 94. It will be observed that the steering flipflop 111 insures that the stepping pulses are applied to the stepping motor windings in this manner in both the forward and backward directions.

When it is desired for the stepping motor to step the tape forward continuously at 100 steps per second, an input signal is applied to an input 131. This signal will pass through an OR gate 133 to enable a free running multivibrator 135. In response to receiving the enabling signal, the free running multivibrator 135 will produce pulses alternately on output channels 137 and 139 with the pulses being produced on each channel at a rate of 100 pulses per second. The pulses produced on channel 139 will pass through the OR gate 105 and be applied to the AND gates 107 and 109. The pulses produced on channel 137 will pass through the OR gate 116 to the steering flipflop 111 and cause the steering flipflop 111 to switch to the opposite state. In this manner the steering flipflop 111 enables the gates 107 and 109 alternately for the successive pulses produced on channel 139 and thus the driving circuits 110 and 113 apply steering pulses alternately to the windings 91 and 92.

As the motor 89 advances the magnetic tape, the tape drives the six-sided reflector 61 as described with reference to FIGS. 1–4. The six-sided reflector by reflecting the light from the source 75 to the photocell 83 causes the photocell 83 to produce output pulses. Each pulse produced by the photocell 83 will be amplified by an amplifier 141 and then applied to a counter 143. The counter 143 counts the applied pulses and when the count registered by the counter 143 reaches 29 it will apply a signal to a flipflop 145 setting the flipflop 145 in its B state. Upon being set in its B state the flipflop 145 will apply a signal to a relay driver circuit 147, which will energize a relay to close its contacts indicating that the tape has been advanced 3.48 inches. About 700 binary characters can be recorded in 3.48 inches of magnetic tape and 700 binary characters correspond to the nominal length of an information block. Accordingly the contacts closed by the relay of the driver 147 can be used to provide an indication that an information block has been recorded.

The flipflop 145 will continue to apply a signal to the relay driver circuit 147, which will energize the relay until the flipflop 145 is set back into its A state. A pulse applied to an input 149 will pass through an OR gate 151 to set the flipflop 145 back to its A state whereupon the relay driver 147 will de-energize its relay allowing the relay contacts to open.

If it is desired to produce an interblock gap, which is a gap on the magnetic tape between information blocks, a pulse will be applied to an input 153 to set a flipflop 155 in its A state. Upon being set in its A state, the flipflop 155 applies a signal to the multivibrator 135 through the OR gate 133 to enable the multivibrator and cause it to start producing pulses on the output channels 137 and 139. The flipflop 155 also applies a signal directly to the multivibrator to cause the multivibrator to change its frequency from 100 cycles per second to 500 cycles per second so that the pulses produced on each of the channels 137 and 139 is at a rate of 500 pulses per second. Upon being switched to its A state the flipflop 155 also applies a signal through an OR gate 157 to reset the counter 143 back to zero and applies a signal to enable an AND gate 159. The multivibrator 135 running at a rate of 500 cycles per second will step the stepping motor at a rate of 500 steps per second.

The advance of the tape will rotate the reflector 61 causing the photocell 83 to produce output pulses which are applied to the counter 143. When the count in the counter 143 reaches a count of eight it will apply a signal through the OR gate 151 to reset the flipflop 145 to its A state and will apply a signal to the AND gate 159, which will be enabled by the flipflop 155 being in its A state. The signal from the counter 143 will therefore pass through the AND gate 159 to actuate a one-shot multivibrator 161. The one-shot multivibrator 161 upon receiving the signal from the AND gate 159 will apply a pulse to reset the flipflop 155 back into its B state and will also apply a pulse to a relay driver 163, which in response to receiving the pulse from the multivibrator will momentarily energize a relay to close its contacts, providing an indication of the interblock gap. The flipflop 155 upon being reset to its B state will apply a pulse through the OR gate 157 to reset the counter 143 back to zero, and will also remove the enabling signal from the multivibrator 135 so that the multivibrator 135 no longer produces pulses on the output lines 137 and 139.

The flipflop 155 also upon being reset to its B state will apply a pulse to a one-shot multivibrator 165, which after a delay produces an output pulse, which is applied through the OR gate 97 to the one-shot multivibrator 99. The reason for the pulse applied from the multivibrator 165 to the multivibrator 99 is to insure that the steering flipflop 111 is in the proper state for receiving the next pulse calling for a forward step on input 95 or calling for a backward step on input 115. Because of the high rate of 500 steps per second that the stepping motor is operated during the interblock gap, the stepping motor may advance one or more steps after the multivibrator 135 stops producing pulses on lines 137 and 139 due to the inertia of the stepping motor and the capstan 29 that it drives. As a result the steering flipflop 111 may not be in the proper state to enable the proper one of the AND gates 107 and 109 for a forward step or to enable the proper one of the AND gates 123 and 125 for a backward step.

If the flipflop 111 were in the wrong state and a pulse were applied to the input 95 calling for a forward step the stepping motor 89 would not advance. Similarly a pulse applied to the input 115 calling for a backward step would not cause the motor 89 to step backwards. The pulse produced by the multivibrator 165 insures that the steering flipflop 111 is in its proper state. If after an interblock gap the steering flipflop 111 is in the wrong state, then the pulse produced by the multivibrator 165 upon being applied through the OR gate 97 to the multivibrator 99 will cause a pulse to be produced on the output channel 101 and on the output channel 103. The pulse produced on channel 101 will not cause the motor to advance because the steering flipflop 111 will be in the wrong state but the pulse produced on the channel 103 will pass through the OR gate 116 to the steering flipflop 111 and switch it to the opposite state so that when a pulse is applied to input 95 calling for a forward step or to the input 115 calling for a backward step the steering flipflop 111 will then be in its proper state. If the flipflop 111 is in its proper state after an interblock gap has been generated, then the pulse produced by the multivibrator 165 will merely cause the stepping motor 89 to advance one additional step while at the same time switching the flipflop 111 to the opposite state so that the steering flipflop 111 will in any case be in the proper state to receive a pulse on input 95 calling for a forward step or a pulse on input 115 calling for a backward step.

The pulses produced by the photocell 83 after being amplified by the amplifier 141 are also applied to a one-shot multivibrator 167 which in response to receiving each pulse is applied to a relay driver 169. In response to receiving the pulse from the multivibrator 167 the relay driver 169 momentarily energizes a relay causing the relay to close its contacts thus providing an indication of tape motion. Since the photocell is irradiated by the reflector 61 and produces an output pulse for every 24 steps that the tape is advanced, the relay driver 169 will energize its relay providing an output indication of tape motion once for every 24 steps that the tape is advanced.

Thus there is provided by the present invention an incremental tape transport with a mechanical tape motion sensor which is of very low inertia and not subject to the disadvantages of time lag or wear and does not apply an excessive load to the tape. With this improved tape motion sensor an improved system for providing an indication of tape motion and for indicating when an information block has been recorded is provided. Also improved means for generating a gap between information blocks is provided.

The above description is of a preferred embodiment of the invention and many modifications may be made thereto without departing from the spirit and scope, which is defined in the appended claims.

What is claimed is:

1. A tape transport comprising
a tape processing station,
means to feed information storage tape past said tape processing station to be processed thereby,
a rotatable reflector having a plurality of reflecting sides distributed about the axis thereof,
means to rotate said reflector in synchronism with the movement of said tape past said tape processing station,
means to direct a beam of light to be reflected by said reflector, and
light responsive means positioned to be repeatedly irradiated by the beam of light reflected by said reflector as said reflector rotates.

2. A tape transport as recited in claim 1 wherein said reflector comprises a hollow thin-walled cylinder having the cross-section of a polygon with the sides of said polygon being the reflecting sides of the reflector distributed about the axis thereof.

3. A tape transport as recited in claim 1 wherein said light responsive means comprises a photocell which produces an output pulse in response to each irradiation by said reflected beam and wherein there is provided a counter connected to count the pulses produced by said photocell.

4. A tape transport as recited in claim 3 wherein there is provided means to produce an output signal when the count registered by said counter reaches a predetermined count.

5. A tape transport as recited in claim 3 wherein there is provided means to control said tape feeding means in accordance with the count registered in said counter.

6. A tape transport comprising
a first tape storage means,
a second tape storage means,
a tape processing station,
tape feeding means selectively operable to incrementally feed information storage tape from said first tape storage means to said second tape storage means past said tape processing station to be processed thereby,
a rotatable reflector having a plurality of reflecting sides distributed about the axis thereof,
means to rotate said reflector in synchronism with the movement of said tape past said tape processing station,
means to direct a beam of light to be reflected by said reflector,
a photocell positioned to be repeatedly irradiated by the beam of light reflected by said reflector as said reflector rotates, and operating to produce an output pulse each time it is irradiated,
a counter connected to count the pulses produced by said photocell, and
means selectively operable to set a predetermined count in said counter and to cause said tape feeding means to automatically feed said tape from said first storage means to said second storage means until the count registered in said counter reaches a second predetermined count.

7. A tape transport comprising
a first tape storage means,
a second tape storage means,
a tape processing station,
tape feeding means to feed tape from said first tape storage means to said second tape storage means past said tape processing station to be processed thereby,
a rotatable reflector having a plurality of reflecting sides distributed about the axis thereof,
means to rotate said reflector in synchronism with the movement of said tape past said tape processing station,
means to direct a beam of light to be reflected by said reflector, and
light responsive means positioned to be repeatedly irradiated by the beam of light reflected by said reflector as said reflector rotates.

8. A tape transport comprising
a tape processing station for processing information storage tape,
means to feed an information storage tape past said tape processing station selectively either in a forward direction or in a backward direction,
a rotatable reflector having a plurality of reflecting sides distributed about the axis thereof,
one-way driving means for rotating said reflector in synchronism with only the forward motion of said tape past said tape processing station,
means to direct a beam of light to be reflected by said reflector, and
light responsive means positioned to be repeatedly irradiated by the beam of light reflected by said reflector as said reflector rotates.

9. A tape transport comprising
a tape processing station for processing information storage tape,
means to feed information storage tape past said tape processing station selectively either in a forward or in a backward direction,
an axle,
means for driving said axle in synchronism with the movement of said tape in both directions past said tape processing station,
a reflector rotatably mounted on said axle and having a plurality of reflecting sides distributed about the axis of said axle,
a drive tab fixed to said axle,
a pin fixed to said reflector in a position to be engaged by said drive tab,
a brake mounted to apply a braking force to said reflector impeding the motion thereof,
means to direct a beam of light to be reflected by said reflector, and
light responsive means positioned to be repeatedly irradiated by the beam of light reflected by said reflector as said reflector rotates.

10. A tape transport comprising
a tape processing station for processing information storage tape,
means to feed information storage tape past said tape processing station selectively either in a forward direction or in a backward direction,
an axle,
a roller engaging said tape to be driven thereby and driving said axle in synchronism with the movement of said tape,
a reflector rotatably mounted on said axle and having a plurality of reflecting sides distributed about the axis of said axle,
a drive tab fixed to said axle,
a pin fixed to said reflector in a position to be engaged by said drive tab,
a brake mounted to apply braking force to said reflector impeding the rotation thereof,
means to direct a source of light to be reflected by said reflector, and
light responsive means positioned to be repeatedly irradiated by the beam of light reflected by said reflector as said reflector rotates.

11. A tape transport comprising
a tape processing station for processing information storage tape,
means to feed information storage tape past said tape processing station to be processed thereby,
a roller engaging said tape to be driven thereby in synchronism with the movement of said tape,
a rotatable reflector having a plurality of reflecting sides distributed about the axis thereof,
a driving connection between said roller and said reflector to rotate said reflector in synchronism with the movement of said tape,
means to direct a beam of light to be reflected by said reflector, and
light responsive means positioned to be repeatedly irradiated by the light beam reflected by said reflector as said reflector rotates.

12. A tape transport comprising
a tape processing station for processing information storage tape,
means to advance information storage tape past said tape processing station to be processed thereby,
a roller engaging said tape to be driven in synchronism with the movement of said tape,
a thin-walled cylinder having a plurality of flat reflecting sides, the cross-section of said cylinder being in the form of a polygon with the sides of said polygon lying in the planes of said reflecting sides,
a driving connection between said roller and said cylinder to rotate said cylinder on its axis in synchronism with the movement of said tape,
means to direct a beam of light to be reflected by the reflecting sides of said cylinder, and
light responsive means positioned to be repeatedly irradiated by the light beam reflected by the reflecting sides of said cylinder as said cylinder rotates.

13. A light chopper comprising a thin walled cylinder having a plurality of flat reflecting sides, the cross section of said cylinder having the form of a polygon with the sides of said polygon lying in the planes of said reflecting sides, a roller adapted to engage a web such as information storage tape to be driven thereby, and driving means for transmitting the rotation of said roller in one direction to said cylinder to rotate said cylinder about the axis thereof and for maintaining said cylinder fixed when said roller changes its direction of rotation from said one direction to the opposite direction of rotation, means to direct a beam of light to be reflected by the reflecting sides of said thin-walled cylinder, and light responsive means positioned to be repeatedly irradiated by the beam of light reflected by the reflecting sides of said cylinder as said cylinder rotates.

References Cited

UNITED STATES PATENTS

| 2,965,720 | 12/1960 | Bumstead et al. | 340—259 X |
| 3,005,582 | 10/1961 | Brede | 226—45 X |

FOREIGN PATENTS

| 1,279,060 | 11/1961 | France. |

ALLEN N. KNOWLES, *Primary Examiner.*

U.S. Cl. X.R.

226—49, 100, 188, 195; 250—236